(12) United States Patent
Cook

(10) Patent No.: US 6,675,009 B1
(45) Date of Patent: Jan. 6, 2004

(54) AUTOMATED CONFIGURATION OF A WIRELESS COMMUNICATION DEVICE

(75) Inventor: Fred S. Cook, Olathe, KS (US)

(73) Assignee: Sprint Communications Company, L.P., Overland Park, KS (US)

( * ) Notice: Subject to any disclaimer, the term of this patent is extended or adjusted under 35 U.S.C. 154(b) by 470 days.

(21) Appl. No.: 09/784,758

(22) Filed: Feb. 15, 2001

(51) Int. Cl.[7] .............................. H04Q 7/20; H04Q 7/34
(52) U.S. Cl. .................. 455/420; 455/423; 455/424; 455/425; 455/67.1
(58) Field of Search ............................ 455/420, 423, 455/424, 425, 67.1, 456.1, 456.5, 404, 517, 403, 422.1, 414.2, 9

(56) References Cited

U.S. PATENT DOCUMENTS 5,095,500 A * 3/1992 Tayloe et al. ............... 455/424
6,308,071 B1 * 10/2001 Kalev ....................... 455/67.1
6,522,888 B1 * 2/2003 Garceran et al. ........... 455/423

* cited by examiner

*Primary Examiner*—William Trost
*Assistant Examiner*—Keith Ferguson

(57) ABSTRACT

A communication system is disclosed that automatically configures a communication device for wireless communication. In the communication system, a first communication device receives identification signals from second communication devices. The first communication device processes the identification signals to generate a composite signal. A control system determines a location of the first communication device in relation to the second communication devices based on the composite signal. The control system generates a virtual topology map of the communication system based on the location of the first communication device and the composite signal. The control system generates wireless communication information based on the virtual topology. The first communication device processes the wireless communication information to configure itself for wireless communication. The communication system advantageously configures communication devices faster and cheaper than prior systems.

28 Claims, 4 Drawing Sheets

COMMUNICATION SYSTEM 100

AUTOMATED CONFIGURATION OF A WIRELESS COMMUNICATION DEVICE

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communication systems, and in particular, to a method and system that automatically configures a communication device for wireless communication.

2. Description of the Prior Art

A wireless communication network is comprised of multiple communication devices placed at different physical locations. Each communication device communicates over a set of frequencies and signal levels. When a new communication device is added to the network, the new communication device has to be configured to communicate based on a selected set of frequencies and signal levels. The selected frequencies and signal levels are determined based on the physical location of the new communication device in relation to the existing communication devices. The selected frequencies and signal levels should be selected to not interfere with communications of the existing communication devices.

Currently, to select frequencies and signal levels for new communication devices, a person looks at a topology map of the area. The topology map denotes or marks the existing communication devices along with information on the existing communication devices. The information includes the frequencies, signal levels, and physical locations of the existing communication devices. The physical locations of the existing communication devices are determined by manual surveying, by using a Global Positioning System, or by some other means. The person determines an approximate location of a new communication device by looking at the topology map, and enters the new communication device into the topology map in its approximate location.

In some cases, the approximate location of a communication device can be determined using triangulation. For instance, if the physical location of a Radio Frequency (RF) transmission source is unknown, a person can take multiple signal strength readings from signals transmitted by the RF transmission source. From the signal readings, the physical location of the RF transmission source can be determined by triangulation. Unfortunately, the signal strength readings must be measured manually.

Once the approximate location of the new communication device is entered into the topology map, the person selects frequencies and signal levels for the new communication device. The selected frequencies and signal levels are chosen based on the position of the new communication device in relation to the existing communication devices. The new communication device is then programmed with the selected frequencies and signal levels.

Unfortunately, the new communication devices are manually programmed, which is time consuming and expensive. Also, manual programming is impractical for mass deployment of residential communication devices. A trained person has to maintain and interpret the topology maps to configure new communication devices. The problem has been partially solved in wireline networks. For instance, some Internet Protocol Local Area Network (IP LAN) analyzers can automatically determine a logical topology of the wireline network based upon connectivity. IP LAN analyzers may use "ping" and other protocol mechanisms to determine what devices are connected to a given LAN cable. In addition, they may use Gateway Protocols, such as RIP, CGP, OSPF, EGP, IS—IS, BGP, EIGRP, and IDRP, to obtain routes, and distance in "hops" or time delay. The logical topology is based upon which devices, by address, are connected to which LAN cables and at what distance. Unfortunately, method of automatically determining the logical topology of the wireline network has not been effectively implemented in a wireless communication system.

SUMMARY OF THE INVENTION

The invention helps to solve the above problems with a communication system that automatically configures a communication device for wireless communication. The communication system advantageously configures the communication device faster and cheaper than prior systems. The communication device also advantageously makes mass deployment of communication devices possible in residential areas. The communication devices do not have to be manually configured, which makes a residential LAN more practical to implement.

The communication system is comprised of a first communication device, a plurality of second communication devices, and a control system. The first communication device is configured to receive identification signals from the plurality of second communication devices. The first communication device is configured to process the identification signals to generate a composite signal. The first communication device is configured to transfer the composite signal. The control system is configured to receive the composite signal and determine a location of the first communication device in relation to the plurality of second communication devices based on the composite signal. The control system is configured to generate a virtual topology map of the communication system based on the location of the first communication device and the composite signal. The control system is configured to generate wireless communication information based on the virtual topology map and the composite signal. Examples of wireless communication information include signal strength, alternative paths, and frequencies available for use. The control system is configured to transfer the wireless communication information. The first communication device is configured to receive the wireless communication information and process the wireless communication information to configure itself for wireless communication.

In some examples, the control system is comprised of an interface and a processor. The interface receives the composite signal from first communication device. The interface transfers the composite signal to the processor. The processor determines the location of the first communication device in relation to the plurality of second communication devices based on the composite signal. The processor generates the virtual topology map of the communication system based on the composite signal and the location of the first communication device. The processor then generates the wireless communication information based on the virtual topology map and the composite signal and transfers the wireless communication information to the interface. The interface transfers the wireless communication information to the first communication device for wireless communication.

DETAILED DESCRIPTION OF THE INVENTION

Figure 1:
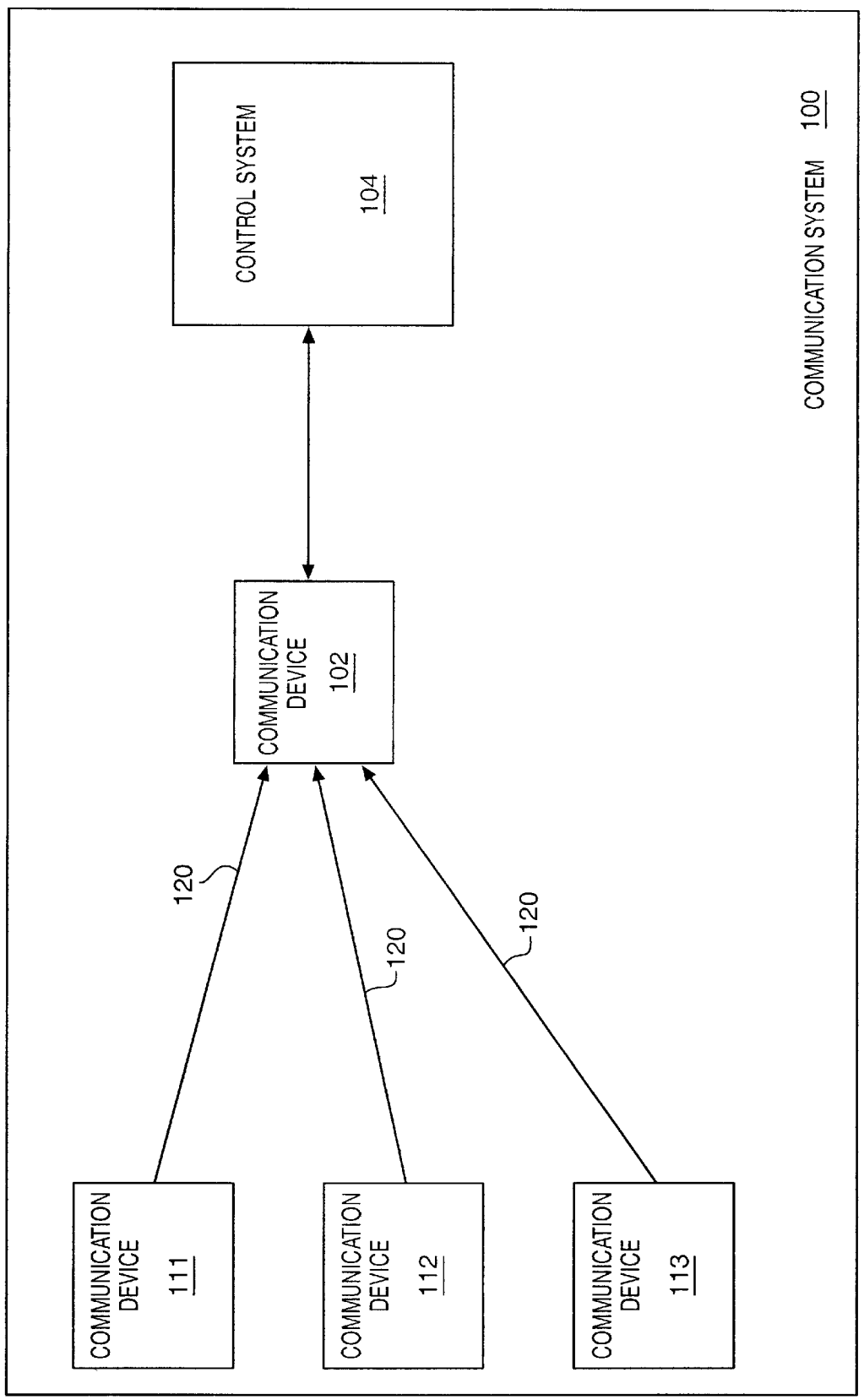
FIG. 1 is a block diagram that illustrates a communication system in an example of the invention.

A Communication System Configuration and Operation—FIG. 1

FIG. 1 depicts a specific example of a communication system in accord with the present invention. Those skilled in the art will appreciate numerous variations from this example that do not depart from the scope of the invention. Those skilled in the art will also appreciate that various features described below could be combined with other embodiments to form multiple variations of the invention. Those skilled in the art will appreciate that some conventional aspects of FIG. 1 have been simplified or omitted for clarity.

FIG. 1 is a block diagram that illustrates a communication system 100 in an example of the invention. Communication system 100 comprises communication devices 102 and 111–113 and a control system 104.

In operation, communication device 102 receives identification signals 120 from communication devices 111–113. Communication device 102 processes the identification signals 120 to generate a composite signal. Communication device 102 transfers the composite signal. Control system 104 receives the composite signal. Control system 104 determines a location of communication device 102 in relation to communication devices 111–113 based on the composite signal. It is assumed that the location of communication devices 111–113 is known. Control system 104 generates a virtual topology map of communication system 100 based on the composite signal and the location of communication device 102. Control system 104 generates wireless communication information based on the virtual topology map and the composite signal. Control system 104 transfers the wireless communication information. Communication device 102 receives the communication information. Communication device 102 processes the wireless communication information to configure itself for wireless communication.

Figure 2:
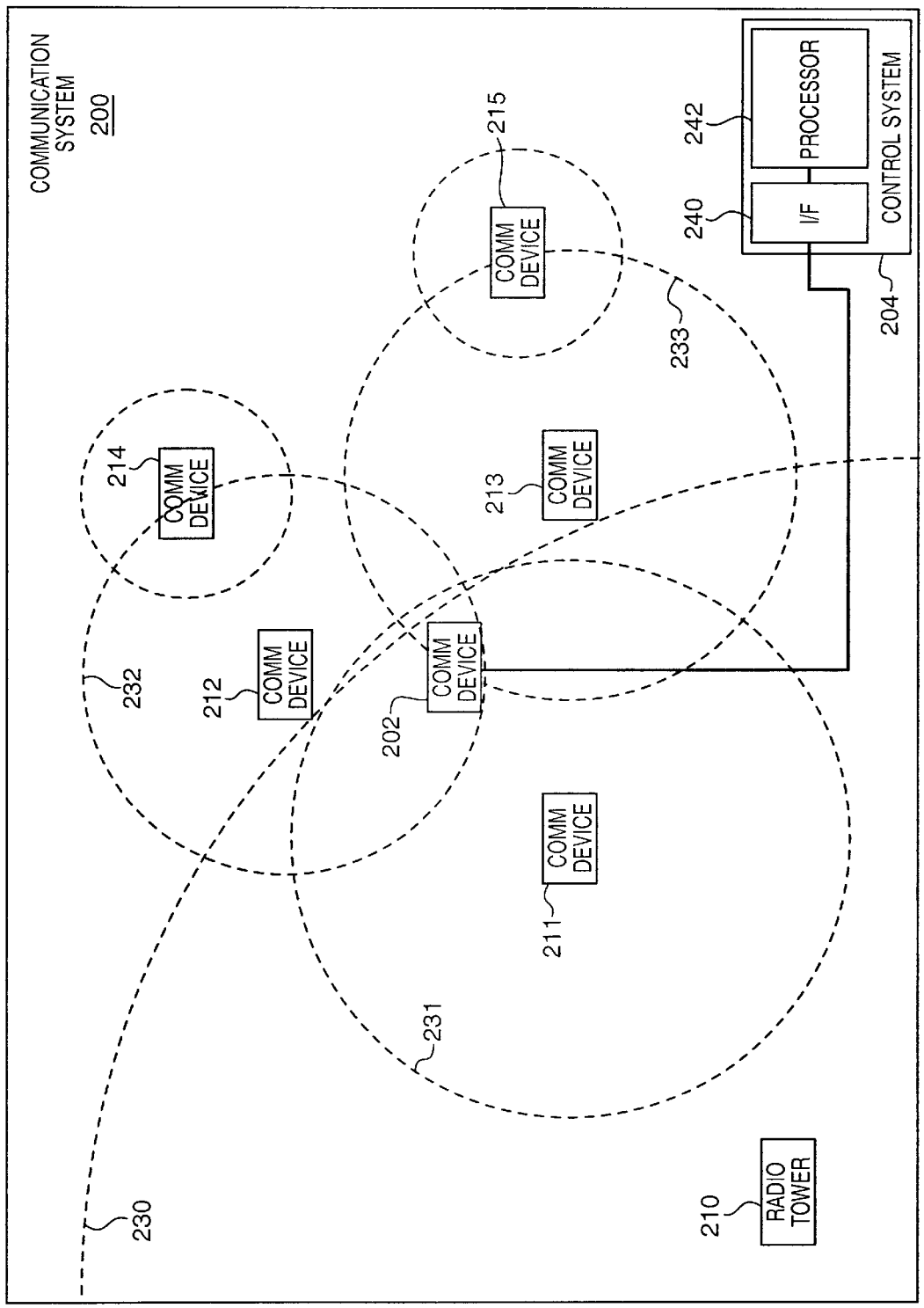
FIG. 2 is a block diagram that illustrates a communication system that generates a wireless communication information table in an example of the invention.
Figure 3:
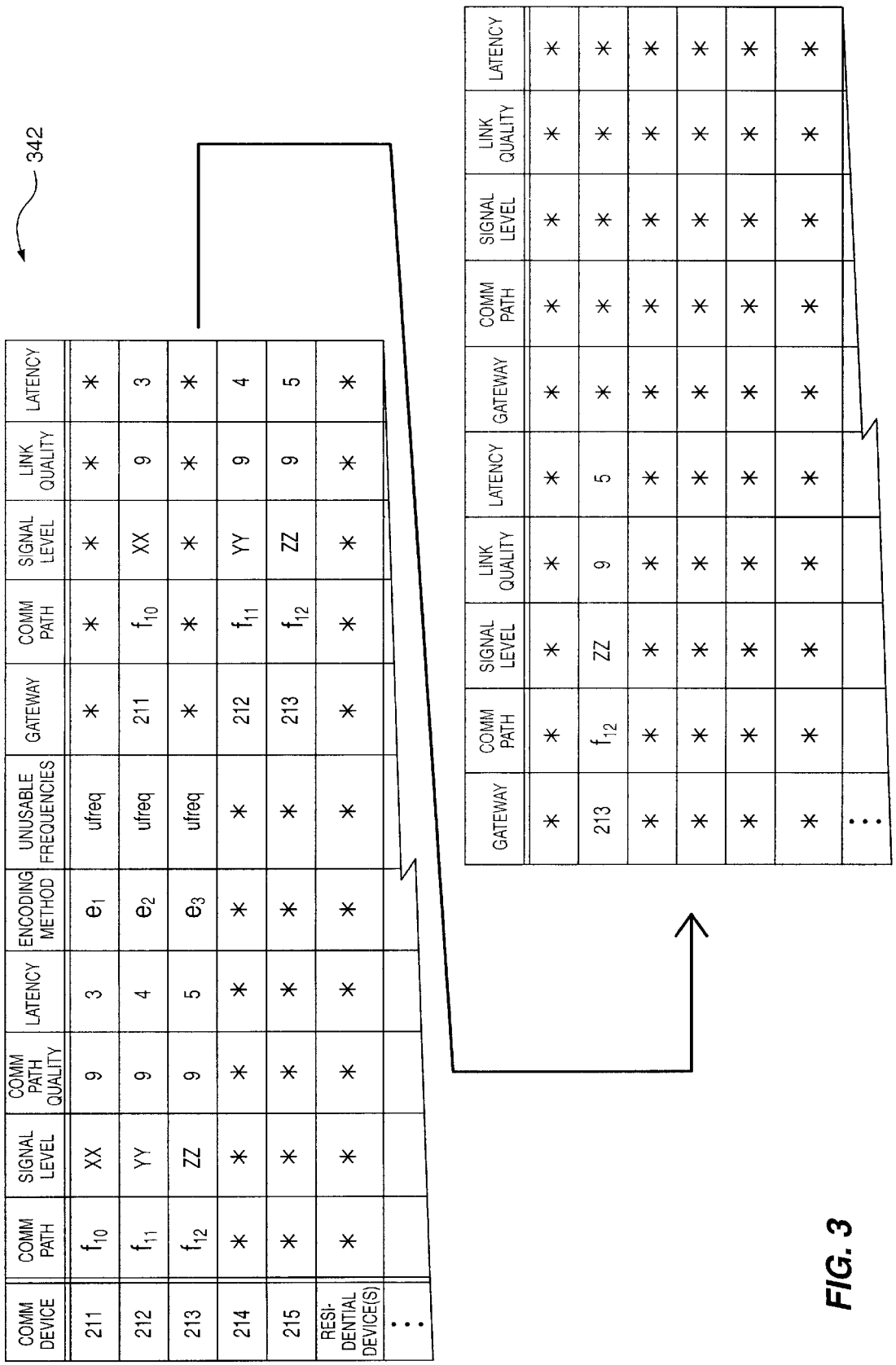
FIG. 3 is a block diagram that illustrates a wireless communication information table in an example of the invention.
Figure 4:
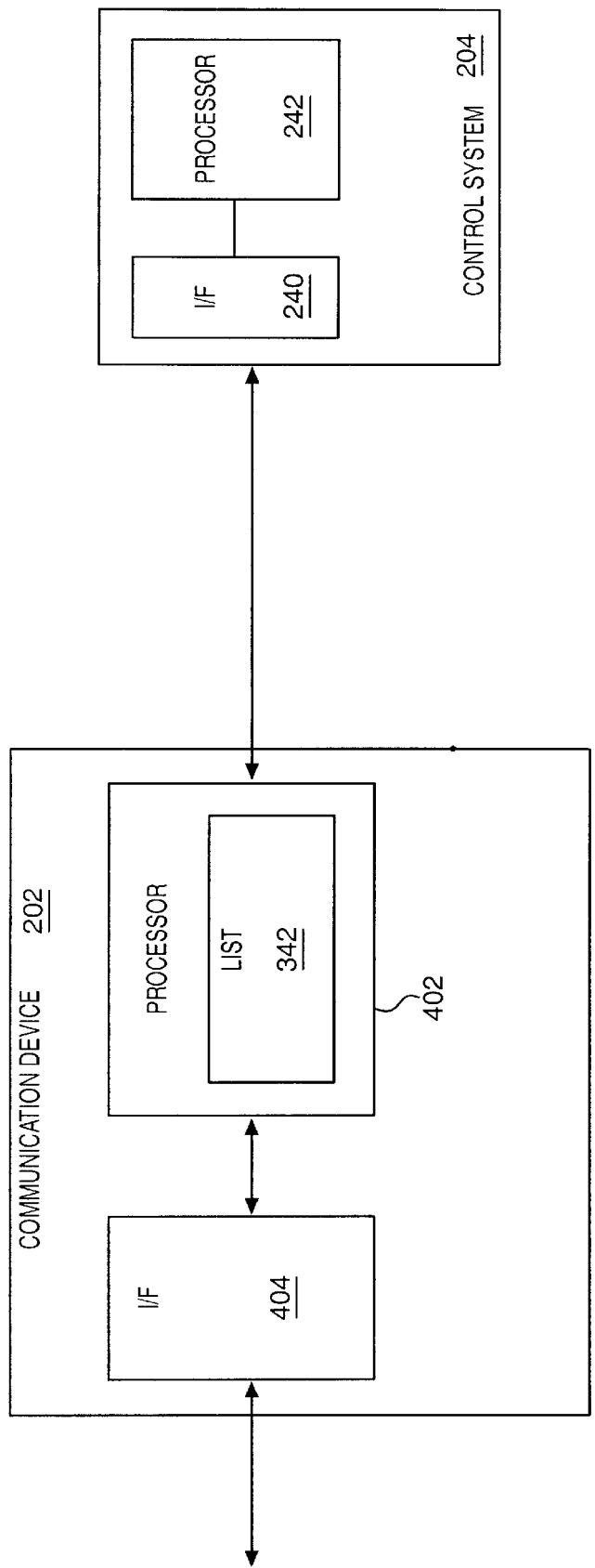
FIG. 4 is a block diagram that illustrates a communication device in an example of the invention.

A Communication System that Generates an Information Table—FIGS. 2–4

FIGS. 2–4 depict a specific example of a communication system in accord with the present invention. Those skilled in the art will appreciate numerous variations from this example that do not depart from the scope of the invention. Those skilled in the art will also appreciate that various features described below could be combined with other embodiments to form multiple variations of the invention. Those skilled in the art will appreciate that some conventional aspects of FIGS. 2–4 have been simplified or omitted for clarity.

FIG. 2 is a block diagram that depicts a physical layout of a communication system 200 in an example of the invention. Communication system 200 is comprised of a communication device 202, a control system 204, and communication devices 210–215. Communication device 210 is a radio tower and will be referred to herein as both communication device 210 and radio tower 210. Communication device 202 is configured to communicate with control system 204. Communication device 202 is configured to communicate with communication devices 210–213. Communication device 212 is configured to communicate with communication device 214. Communication device 213 is configured to communicate with communication device 215. Control system 204 is comprised of an interface 240 and a processor 242. Control system 204 typically includes a Mobile Telephone Switching Office (MTSO).

In operation, communication devices 210–213 transmit and receive over a band of frequencies to create cells 230–233, respectively. Communication devices 210–213 periodically transmit identification signals. The identification signals identify communication devices 210–213 by identification numbers, the frequency of transmission of communication devices 210–213, the signal level used by communication devices 210–213, and other information. Communication device 202 listens to the band of frequencies that communication devices 210–213 transmit over. The band of frequencies is preset in communication device 202 or is provided by control system 204. Because communication device 202 is physically located within cells 230–233, communication device 202 receives the identification signals from communication devices 210–213. Communication device 202 also measures the signal level of the identification signals received. Communication device 202 collects the identification signals and processes the identification signals to generate a composite signal. The composite signal includes information on communication devices 210–213, such as identification numbers and transmission frequencies of communication devices 210–213. The composite signal also includes signal levels measured from the identification signals transmitted by each device 210–213.

Those skilled in the art will appreciate that communication device 202 could transmit a request signal to communication devices 210–213. Communication device 202 could be programmed with a control frequency. Communication device 202 would transmit the request signal over the control frequency to communication devices 210–213. Communication devices 210–213 would then transmit the identification signals to communication device 202 in response to the request signal.

Communication device 202 transfers the composite signal to control system 204. Communication device 202 has a dedicated connection with control system 204, such as a Digital Subscriber Line (DSL) connection or a Plain Old Telephone Service (POTS) connection. Interface 240 receives the composite signal and transfers the composite signal to processor 242. Processor 242 processes the composite signal to generate a virtual topology map of communication system 200. The virtual topology map represents the physical locations of communication devices 210–213. Processor 242 determines an estimated physical location of communication device 202 based on the composite signal using triangulation. For instance, processor 242 could use the measured signal levels of the identification signals, noise levels of the identification signals, and the locations of communication devices 210–213 to triangulate. It is assumed that processor 242 knows the physical location of communication devices 210–213. Those skilled in the art will appreciate that communication device 202 could include a satellite receiver that determines the location of communication device 202. Alternatively, communication devices 210–213 could know their own physical location and transmit location information to communication device 202. Communication device 202 could then transmit the location information to processor 242 in the composite signal. Communication devices 210–213 could obtain the location information from a satellite receiver such as a Global Positioning System.

Processor 242 enters communication device 202 in the virtual topology map. Processor 242 generates a wireless communication information table based on the virtual topology map. The wireless communication information includes communication paths between communication device 202 and communication devices 211–213. The communication paths could be frequencies available to communication device 202 for wireless communication. The wireless communication information could also include communication paths with residential devices in the same premises as communication device 202, such as in a household. The frequencies could be public frequencies, private licensed frequencies, private unlicensed frequencies, or some other frequency. The communication paths could also include Multi-Point Multi-Channel Distribution Service (MMDS) channels. The wireless communication information also includes signal levels, communication path quality, latency information of the communication paths, encoding methods, and other information.

FIG. 3 is a block diagram that depicts a wireless communication information table 342 in an example of the invention. The first column of table 342 lists communication devices 211–215 that communication device 202 can communicate with. The first column also lists residential device (s) within the same premises as communication device 202, that communication device 202 can communicate with. The second column of table 342 lists available communication paths for communication device 202. The third column lists the available signal levels for the communication paths in the second column. The fourth column lists the link quality of the communication paths in the second column. The fifth column lists the latency of the communication paths in the second column. The sixth column lists encoding methods used for the communication paths in the second column. The seventh column lists unusable frequencies. The remainder of table 342 is for gateway paths that will be discussed later. Table 342 could contain more wireless communication information as needed.

For an example of how processor 242 generates table 342, assume that radio tower 210 transmits over a frequency $f_1$ at a signal level w, communication device 211 transmits over frequency $f_{10}$ at a signal level x, communication device 212 transmits over frequency $f_{11}$ at a signal level y, and communication device 213 transmits over frequency $f_{12}$ at a signal level z. Based on the virtual topology map, processor 242 could determine that communication device 202 cannot use frequency $f_1$ because it would interfere with transmissions of radio tower 210. Processor 242 could determine that communication device 202 can use frequency $f_{10}$ at a signal level xx, frequency $f_{11}$ at a signal level yy, and frequency $f_{12}$ at a signal level zz, to communicate with communication devices 211–213, respectively. Processor could determine that communication device 202 can use frequency $f_{17}$ at a signal level ww to communicate with residential devices within the same premises. Processor 242 selects the frequencies that communication system 202 can use based on the capabilities of communication devices 211–213 and the residential devices. Processor 242 selects the frequencies so that they do not interfere with other frequencies in the vicinity. And processor 242 selects the frequencies based upon any authorizations or licenses that communication device 202 has obtained.

FIG. 4 is a block diagram that depicts a communication device 202 in an example of the invention. Communication device 202 is comprised of a processor 402 coupled to an interface 404. Processor 402 receives table 342 from control system 204 and processes table 342. Processor 402 then configures interface 404 based on table 342 for wireless communication. For example, if communication device 202 needs to communicate with communication device 211, then processor 402 looks to the first row of table 342. Processor 402 configures interface 404 to transmit at a frequency $f_{10}$ and at a signal level xx. Processor 402 also configures interface 404 to encode the data being transmitted based on encoding method $e_1$. An example of an encoding method is Code Division Multiple Access (CDMA). Processor 402 also looks for unusable frequencies ufreq. If interface 404 receives a frequency that has been labeled unusable by table 342, then processor 402 reports the unauthorized use of the frequency to control system 204.

If communication device 202 needs to communicate with communication device 212, then processor 402 looks to the second row of table 342. Processor 402 configures interface 404 to transmit at a frequency $f_{11}$ and at a signal level yy. Processor 402 configures interface 404 to encode the data being transmitted based on encoding method $e_2$.

If communication device 202 needs to communicate with communication device 212 but is unable to communicate over frequency $f_{11}$, processor 402 can look to a first gateway path in table 342. A gateway path is an alternate route or backup route for communication devices to communicate within a communication system. The first gateway path to communication device 212 is through communication device 211. Processor 402 configures interface 404 to transmit at a frequency $f_{10}$ and at a signal level xx.

Those skilled in the art will appreciate that control system 204 could generate table 342 for communication device 202 in the above manner if communication device 202 were initially added to communication system 200. Control system 204 could also periodically generate table 342 for communication device 202 in the above manner to ensure that communication device 202 is not interfering with communication devices in the vicinity.

Once interface 404 is initially configured according to table 342, processor 402 sends a connectivity query, through interface 404, to communication devices 211–213 to identify other communication devices in the vicinity. Communication device 212 transmits a reply that identifies communication device 214. The reply also includes the physical location of communication device 214 and the communication path with communication device 214. Communication device 213 also transmits a reply to the query that identifies communication device 215. The reply also includes the physical location of communication device 215 and the communication path with communication device 215.

Processor 402 adds communication devices 214–215 to table 342 and updates table 342 based on the information provided by communication devices 214–215. Processor 402 adds gateway paths to table 342 for communication devices 214–215. Processor 402 could continue to add communication devices and gateway paths up to a configurable depth. For instance, processor 402 only adds communication devices that are three gateways away.

Those skilled in the art will appreciate variations of the above-described embodiments that fall within the scope of the invention. As a result, the invention is not limited to the specific examples and illustrations discussed above, but only by the following claims and their equivalents.

I claim:

1. A method of operating a communication system, the method comprising:

in a first communication device, receiving identification signals from a plurality of second communication devices, processing the identification signals to generate a composite signal, and transferring the composite signal;

in a control system, receiving the composite signal and determining a location of the first communication device in relation to the plurality of second communication devices based on the composite signal;

in the control system, generating a virtual topology map of the communication system based on the composite signal and the location of the first communication device;

in the control system, generating wireless communication information based on the virtual topology map and the composite signal and transferring the wireless communication information; and in the first communication device, receiving the wireless communication information and processing the wireless communication information to configure the first communication device for wireless communication.

2. The method of claim 1 further comprising transmitting a request signal from the first communication device to the plurality of second communication devices wherein the request signal requests the plurality of second communication devices to transmit the identification signals.

3. The method of claim 1 wherein the control system comprises a Mobile Telephone Switching Office (MTSO).

4. The method of claim 1 wherein the wireless communication comprises communicating voice signals based on the wireless communication information.

5. The method of claim 1 wherein the wireless communication comprises communicating video signals based on the wireless communication information.

6. The method of claim 1 wherein the wireless communication comprises communicating Internet packets based on the wireless communication information.

7. The method of claim 1 wherein the identification signals include frequencies and signal levels for the plurality of second communication devices.

8. The method of claim 1 wherein determining the location of the first communication device further comprises determining an estimated location of the first communication device by triangulation.

9. The method of claim 1 wherein the wireless communication information comprises frequencies over which the first communication device can communicate.

10. The method of claim 9 wherein the wireless communication information comprises signal levels for the frequencies.

11. The method of claim 1 wherein the wireless communication information comprises Multi-Point Multi-Channel Distribution Service (MMDS) channels.

12. A communication system, comprising:

a first communication device configured to receive identification signals from a plurality of second communication devices, process the identification signals to generate a composite signal, transfer the composite signal, receive wireless communication information, and process the wireless communication information to configure the first communication device for wireless communication; and a control system configured to receive the composite signal, determine a location of the first communication device in relation to the plurality of second communication devices based on the composite signal, generate a virtual topology map of the communication system based on the composite signal and the location of the first communication device, generate the wireless communication information based on the virtual topology map and the composite signal, and transfer the wireless communication information.

13. The communication system of claim 12 wherein the first communication device is further configured to transmit a request signal to the plurality of second communication devices wherein the request signal requests the plurality of second communication devices to transmit the identification signals.

14. The communication system of claim 12 wherein the control system comprises a Mobile Telephone Switching Office (MTSO).

15. The communication system of claim 12 wherein the wireless communication comprises communicating voice signals based on the wireless communication information.

16. The communication system of claim 12 wherein the wireless communication comprises communicating video signals based on the wireless communication information.

17. The communication system of claim 12 wherein the wireless communication comprises communicating Internet packets based on the wireless communication information.

18. The communication system of claim 12 wherein the identification signals include frequencies and signal levels for the plurality of second communication devices.

19. The communication system of claim 12 wherein the control system is further configured to determine an estimated location of the first communication device by triangulation.

20. The communication system of claim 12 wherein the wireless communication information comprises frequencies over which the first communication device can communicate.

21. The communication system of claim 20 wherein the wireless communication information comprises signal levels for the frequencies.

22. The communication system of claim 12 wherein the wireless communication information comprises Multi-Point Multi-Channel Distribution Service (MMDS) channels.

23. A method of operating a control system within a communication system, the method comprising:

receiving a composite signal from a first communication device wherein the composite signal identifies a plurality of second communication devices that are in communication with the first communication device;

determining a location of the first communication device in relation to the plurality of second communication devices based on the composite signal;

generating a virtual topology map of the communication system based on the composite signal and the location of the first communication device;

generating wireless communication information based on the virtual topology map and the composite signal; and transferring the wireless communication information to the first communication device for wireless communication.

24. The method of claim 23 wherein the control system comprises a Mobile Telephone Switching Office (MTSO).

25. The method of claim 23 wherein determining the location of the first communication device further comprises determining an estimated location of the first communication device by triangulation.

26. A control system within a communication system, comprising:

an interface configured to receive a composite signal from a first communication device wherein the composite signal identifies a plurality of second communication devices that are in communication with the first communication device and transfer wireless communication information to the first communication device for wireless communication; and a processor configured to receive the composite signal from the interface, determine a location of the first communication device in relation to the plurality of second communication devices based on the composite signal, generate a virtual topology map of the communication system based on the composite signal and the location of the first communication device, generate the wireless communication information based on the virtual topology map and the composite signal, and transfer the wireless communication information to the interface.

27. The control system of claim 26 wherein the interface and processor comprise a Mobile Telephone Switching Office (MTSO).

28. The control system of claim 26 wherein the processor is further configured to determine an estimated location of the first communication device by triangulation.

* * * * *